(12) United States Patent
Kou et al.

(10) Patent No.: US 12,530,621 B2
(45) Date of Patent: Jan. 20, 2026

(54) ARTIFICIAL INTELLIGENCE ENABLED VEHICLE OPERATING SYSTEM

(71) Applicants: Apollo Autonomous Driving USA LLC, Sunnyvale, CA (US); Beijing Baidu Netcom Science Technology Co., Ltd., Beijing (CN)

(72) Inventors: Haofeng Kou, Sunnyvale, CA (US); Xiaoyi Zhu, Beijing (CN); Manjiang Zhang, Sunnyvale, CA (US); Helen K. Pan, Sunnyvale, CA (US)

(73) Assignees: APOLLO AUTONOMOUS DRIVING USA LLC, Sunnyvale, CA (US); BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 348 days.

(21) Appl. No.: 18/005,904

(22) PCT Filed: Nov. 28, 2022

(86) PCT No.: PCT/CN2022/134810
§ 371 (c)(1),
(2) Date: Jan. 18, 2023

(87) PCT Pub. No.: WO2024/113120
PCT Pub. Date: Jun. 6, 2024

(65) Prior Publication Data
US 2025/0094854 A1 Mar. 20, 2025

(51) Int. Cl.
*B60W 60/00* (2020.01)
*G06N 3/045* (2023.01)
(Continued)

(52) U.S. Cl.
CPC ............. *G06N 20/00* (2019.01); *B60W 60/00* (2020.02)

(58) Field of Classification Search
CPC ....... B60W 2420/403; B60W 2400/00; B60W 60/0027; B60W 2555/20; B60W 2756/10;
(Continued)

(56) References Cited

U.S. PATENT DOCUMENTS

2019/0212749 A1* 7/2019 Chen .................... G05D 1/0088
2022/0044497 A1* 2/2022 Yokoyama ............ G06F 1/3206
(Continued)

*Primary Examiner* — Rachid Bendidi
*Assistant Examiner* — Hossam M Abd El Latif
(74) *Attorney, Agent, or Firm* — WOMBLE BOND DICKINSON (US) LLP

(57) ABSTRACT

A vehicle operating system (VOS) in an autonomous driving vehicle (ADV) can communicate with a cloud platform to automatically train AI models. The VOS collects real-time data from the ADV, and generates inference data based on the real-time data using a teacher edge model of an AI model and generates second inference data based on the real-time data using a student edge model of the AI model. The VOS then obtains one or more differences between the first inference data and the second inference data, and retrains the student edge model of the AI model based on the one or more differences. Both real-time data and the retrained student edge model are uploaded to a cloud platform for use in upgrading the student edge model and the teacher edge model on the cloud platform. The upgraded teacher edge model and the student edge model can be redeployed over-the-air (OTA) through a software define process. The above process of training AI models can be repeated in a closed-loop automatically without user intervention.

20 Claims, 12 Drawing Sheets

(51) Int. Cl.
*G06N 3/0464* (2023.01)
*G06N 3/09* (2023.01)
*G06N 20/00* (2019.01)

(58) Field of Classification Search
CPC .. G07C 5/0808; G07C 5/0816; G07C 5/0841; G06F 11/3688; G06F 11/3696; G06F 18/2148; G06F 11/0754; G06F 11/0739; G06F 11/3692; G06F 2201/81; G06F 11/3684; G06N 20/00; G06N 3/08; G06N 5/04; G06N 3/02; G06N 7/023; G06N 7/02; G06V 10/82; G06V 20/58; G06V 20/56; G06V 10/764
USPC .......................................................... 701/27
See application file for complete search history.

(56) References Cited

U.S. PATENT DOCUMENTS

| | | | |
|---|---|---|---|
| 2023/0054706 A1* | 2/2023 | Seki | G06N 3/045 |
| 2023/0376784 A1* | 11/2023 | Hussein | G06N 3/0455 |
| 2023/0409876 A1* | 12/2023 | Agrawal | G06N 3/045 |
| 2025/0045066 A1* | 2/2025 | Lee | G06N 3/063 |

* cited by examiner

ARTIFICIAL INTELLIGENCE ENABLED VEHICLE OPERATING SYSTEM

CROSS-REFERENCE TO RELATED APPLICATIONS

This application is a National Stage of International Application No. PCT/CN2022/134810, filed Nov. 28, 2022, which is hereby incorporated by reference in its entirety.

TECHNICAL FIELD

Embodiments of the present disclosure relate generally to vehicle operating systems. More particularly, embodiments of the disclosure relate to a method of training artificial intelligence (AI) models for use in a vehicle operating system (VOS).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV includes many hardware and software components that are managed by a vehicle operating system (VOS), which may run on one or more multiprocessor units (MPUs) and one or more microcontroller units (MCUs). One popular VOS is Linux, due to its friendliness to developers, and easiness of migration, expansion, revision, and upgrading.

The VOS can run a variety of software applications and services for operating the ADV, including perceiving the environment, planning trajectories, controlling internal vehicle temperatures, and reducing power consumption. These tasks, however, can be more efficiently performed using AI models. Training AI models and refining the AI models can be time-consuming.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
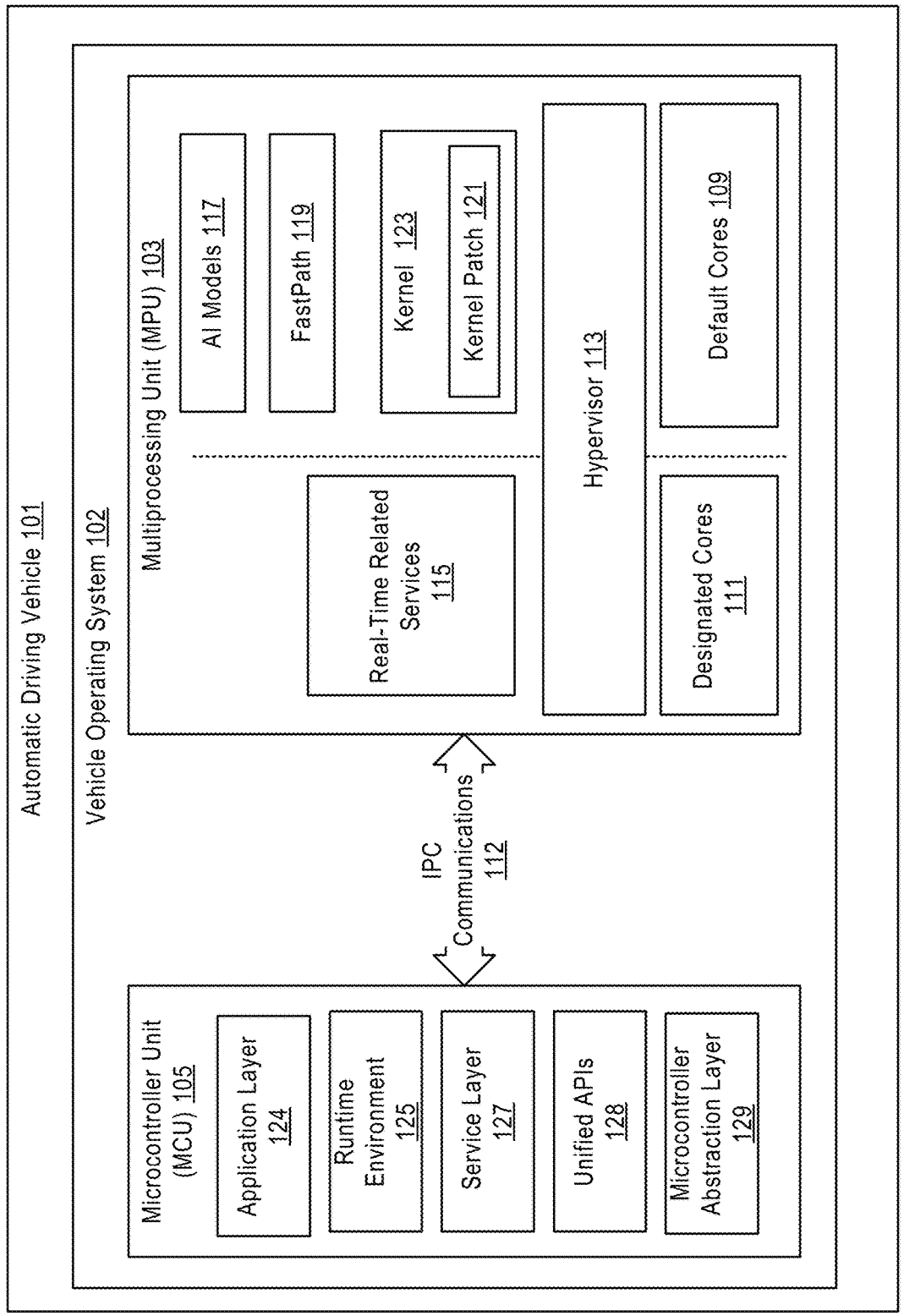
FIG. 1 illustrates a vehicle operation system (VOS) in an autonomous driving vehicle according to an embodiment of the invention.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a vehicle operating system (VOS) in an autonomous driving vehicle (ADV) can communicate with a cloud platform to automatically train AI models. The VOS collects real-time data from the ADV, and generates inference data based on the real-time data using a teacher edge model of an AI model, and generates second inference data based on the real-time data using a student edge model of the AI model. The VOS then obtains one or more differences between the first inference data and the second inference data, and retrains the student edge model based on the one or more differences. Both labeled real-time data and the retrained student edge model can be uploaded to a cloud platform for use in upgrading the student edge model and the teacher edge model in the cloud platform.

In an embodiment, the cloud platform include a cloud model corresponding from which the student edge model and the teacher edge model are derived. The cloud model can be configured to retrain the teacher edge model and the student edge model based at least partly on the real-time data labeled with the second inference data in view of the retrained student edge model of the AI model. The retrained teacher edge model and the retrained student edge model can be redeployed to the ADV through over-the-air update to replace the existing student edge model and the existing teacher edge model.

Thus, the ADV and the cloud platform can form an automatic training loop, in which any AI model can be initially trained on the cloud platform, deployed to the ADV where it performs inference on real-time data and can be refined. The refined student edge model can be uploaded to the platform together with newly labeled training data to the cloud platform. The cloud platform can include new training data labeled by the teacher edge models in multiple different ADVs, and uses the new training data to upgrade both the teacher edge model and the student edge model for redeployment to each ADV.

In an embodiment, the AI model is one of a plurality of AI models deployed to the VOS of the ADV. The plurality of AI models include a power consumption reduction AI model, a storage life extension AI model, a temperature prediction and control AI model, a resource management AI model, an IPC optimization AI model, a perception AI model, a localization AI model, a prediction AI model, a decision AI model, a planning AI model, and a control AI model. Each of the plurality of AI models can be a deep learning neural network.

In an embodiment, the power consumption reduction AI model can classify a task as a task having a priority level that corresponds to a power consumption limit. The storage life extension AI model is configured to select a data path that requires the smallest number of writes to a storage medium when a plurality of data paths are available. The temperature prediction and control AI model is configured to predict that a sequence of applications is to cause a temperature of a multiprocessor unit (MPU) to reach a predetermined level, and to schedule a different sequence of applications so as to avoid the temperature from reaching the predetermined level. The IPC optimization AI model is configured to select a communication channel between the multiprocessor unit (MPU) and a microcontroller unit (MCU) based on a number of factors, including traffic in the communication channel and a priority level of a task associated with a data transfer.

The embodiments disclosed herein are implemented in a software defined vehicle (i.e., ADV), which offers significant safety and convenience features to enable new in-vehicle experiences and functions through software, and delivers updates and services over-the-air (OTA). The teacher edge model and the student edge model are upgraded on a cloud platform, and are deployed through OTA to the ADV, where the two models perform inferences on the same real-time data, their inference results are compared, the real-time data is labeled by inference data from the teacher edge model, the student edge model is retrained to become a retrained student edge model. Then, the retrained student edge model and the labeled data are uploaded to the cloud platform, wherein the teacher edge model and the student edge model are upgraded based on labeled data from various vehicles connected to the cloud platform. The above process can be repeated automatically in a closed loop without user intervention, such that the VOS in the ADV can be upgraded following a software define process through OTA.

The other embodiments, functions, and advantages will be apparent from the accompanying drawings and from the detailed description that follows.

FIG. 1 illustrates a vehicle operation system (VOS) 102 in an autonomous driving vehicle 101 according to an embodiment of the invention.

As used herein and as shown in FIG. 1, the VOS 102 includes hardware and a software stack running on the hardware. The hardware of the VOS 102 includes an MPU 103 and an MCU 105. The software stack of the VOS 102 can be scattered across the MPU 103 and the MCU 105. The MPU 103 can include a kernel 123, a hypervisor 113, one or more real-time related services 115, a kernel patch 121, a fastpath packet 119, and one or more artificial intelligence models 117. The MCU 105 can include a microcontroller abstraction layer (MCAL) 129; a set of unified APIs 128; a service layer 127; a runtime environment 125; and an application layer 124. Both the MCU 105 and the MPU 103 can include multiple cores, each of which can be a central processing unit (CPU), a graphical processing unit (GPU), a digital signal processor (DSP), or another type of processor.

The number of the MPUs, the number of the ECUs, and the number of cores on the MCU 105 and the MPU 103 are all provided for the purpose of illustrating the embodiments of the invention. In actual implementations, these numbers may be different.

The kernel 123 can be responsible for a number of kernel-level tasks, such as scheduling processes, device management, interrupt handling, memory management, and process management. The MPU 103 can communicate with the MCU 105 via interprocess communication (IPC) 111, such that the kernel 123 can schedule processes to run on the cores of the MCU.

As shown in FIG. 1, the multiple cores of the MPU 103 can be partitioned into a first set of cores called designated cores 111 and a second set of cores called default cores 109. The number of cores in each set of cores can be determined by users (e.g., vehicle manufacturers) based on their needs and requirements for real-time performance.

As an example, in a 16-core MPU, two cores may be the designated cores 111, and the remaining 14 cores may be default cores 109. The two sets of cores are isolated from each other, with the designated cores 111 supporting the real-time related services 115, and the default cores 109 supporting the AI models 117, the fastpath packet 119, the kernel patch 121, and the kernel 123. The hypervisor 113 can run on any of the designated cores 111 or any of the default cores 109 to virtualize both sets of cores.

In an embodiment, the real-time related services 115 can include a networking service, a communication service, a mission management service, and a crypto service. These services can be affinized to the designated cores 111, and run only on these cores 111.

Further, the real-time related services 115 can be given a priority that is higher than that of kernel-level threads. By default, in a soft real-time system, such as Linux, the kernel-level threads are given the highest priorities because these threads are used by the kernel 123 to provide privileged services to applications, schedule process, and to keep track of what processes are running on the system, how much and which resources are allocated to what process. Thus, execution of the real-time related services 115, in a default Linux system, cannot be guaranteed, and needs to be dependent on the total workload of the system.

Thus, through core partition, services affinization, and kernel thread level downgrading, all the kernel-level threads are either isolated to the default cores 109 or have their priority levels downgraded to levels below that of any of the real-time related services 115, and, thus, the related-time related services 115 can be guaranteed to be executed on the designated cores 111 except when hardware interrupts occur, which effectively converts the VOS 102 into a hard real-time system.

In an embodiment, the kernel patch 121 can be a hard real-time package (e.g., an open source package) or a hard real-time kernel, depending on the configuration of the kernel 123. If the kernel 123 is a native kernel, e.g., Monta Vista™, the kernel patch 121 can be modified using the hard real-time package to make the VOS 102 substantially close to hard real-time in terms of performance and/or safety. In an embodiment, the hard real-time package can be one of an open-source package, and can be used to patch of the scheduler of the kernel 123. If the kernel 123 is one of two kernels in a dual kernel configuration, e.g., WindRiver™, the kernel patch 121 can replace one of the two kernels such that the kernel patch 121 can run as a hard real-time kernel in parallel to the kernel that has not been replaced.

For example, the patching kernel (i.e., the kernel patch 121) can run as a hard real-time co-kernel side by side with the other kernel (e.g., a soft real-time kernel) to deal with all time-critical activities, such as handling interrupts, and scheduling real-time threads. The patching kernel can have higher priority over the native kernel activities.

Since the kernel patch 121 is a hard real-time packet, it can convert the VOS 102 to a system with a performance that is substantially close to hard real-time. A hard real-time VOS is a VOS in which a failure to meet even a single deadline may lead to a complete or appalling system failure, while a soft real-time VOS is a VOS in which one or more failures to meet the deadline are not considered a complete system failure, but that performance is considered to be degraded.

In an embodiment, the VOS 102 may have a mapping table with entries that map architectures of MPUs (including versions) to modes of configurations (i.e., native kernel or dual kernel). When the VOS 102 needs to be patched to obtain hard real-time performance, the VOS can automatically determine what type of patching package is needed.

In an embodiment, the multiple cores in the MCU 105 can include the same set of services, such as an Ethernet service, a memory service, a diagnostics service, a communication service, or an ECU state management service. Each of the services can be customized according to an industry standard, such as the AutoSAR standard. Further, the number of customized services can be adaptively adjusted based on a number of factors, such as the type of industry certification that the VOS needs to pass, and the workload. Each of the cores can also support the implementation of customized functionalities in their respective application layers 113, 127, and 141. Each application can include specific software components and applications that perform specific tasks as per instructions according to an industry standard such as AutoSAR. The number of applications and the types of the applications can also be adaptively adjusted based on the type of industry certification that the VOS needs to pass and customer needs.

The runtime environment on each core can be a middleware layer between the service layer and the application layer, and can provide communication services for the application layer. The MCAL on each core implements an interface for the specific microcontroller. Each MCAL has layers of software that are integrated with the MCU 105 through registers, and can provide drivers like system drivers, diagnostics drivers, memory drivers, communication drivers (CAN, LIN, Ethernet, etc.), and I/O drivers. The MCU 105 also includes a board support package (BSP) (not shown) with hardware-specific boot firmware and other routines that allow the upper software applications to function in a given hardware environment.

The MCAL 129 as well as the BSP are hardware dependent, which means that they are specific to the MCU 105, which can be one of multiple types. For example, the MCU 105 can be one of a programmable interface controller (PIC) microcontroller, an 8051 microcontroller, an Alf and Vegard's RISC (AVR) microcontroller, an Advanced RISC Machine (ARM) microcontroller, or a Renaissance Semiconductor for Advanced Solutions (Renesas) microcontroller.

In an embodiment, the set of unified APIs 128 can be used to load one or more MCU drivers corresponding to the type of MCU drivers in the MCAL layer for each customized service in the service layer, and to load one or more I/O drivers for I/O devices associated with the MCU 105.

The MCU drivers as discussed above can include system drivers, diagnostics drivers, memory drivers, and communication drivers (CAN, LIN, Ethernet, etc.). These MCU drivers, as well as the I/O drivers, are hardware dependent.

Each type of MCU has a specific set of drivers, and each type of I/O device has a specific set of I/O drivers.

In this disclosure, each MCAL can include drivers for multiple types of MCUs, and multiple types of I/O devices. The number of types of MCUs and the types of I/O devices can be adjusted and/or dynamically configured.

In this embodiment, the cores are separated from each other at the level of the hardware and can communicate with each other only at the application level. Thus, the cores, although on the same MCU 105, may have different MCU drivers and different I/O devices due to the architectural differences between each core at the hardware level.

Thus, the unified APIs 128 on each core effectively integrate a device path for each service in the service layer on each core. Each service can have a path on the device (i.e., the core) across the multiple layers of software, including the MCAL and the service layer.

With such vertical integrations by the unified APIs on each core for each service, the set of services and the application tasks can run on any type of MCU and work with any I/O device with proper configurations, despite the hardware dependency of MCU drivers and the I/O drivers. The unified APIs effectively function as a standard wrapper for the low-level details of the hardware on the MCU and the hardware of the cores.

In an embodiment, the unified APIs on each core are identical, the set of services on each core are also identical, and the application tasks on each core can be different. The services and the application tasks on each core can be scheduled by the kernel 123 on the MPU 103, but run asynchronously and independently from each other, such that there is no dependency between services on different cores, and no dependency between application tasks, to ensure hard real-time performance of the VOS 102.

In an embodiment, although the cores are separated at the hardware level, and the services and application tasks on the cores run independently and asynchronously, the cores can communicate with each other using IPC via hardware-protected memories. Each hardware-protected memory can be a region of memory that is protected at the hardware level to prevent access by unauthorized entities, e.g., unauthorized cores.

Each core has a set of hardware-protected memories, including a pair of hardware-protected memories for each other core on the CPU, and the pair of hardware-protected memories is accessible only to the core itself and the other core. The pair of hardware-protected memories includes a write memory and a read memory.

These hardware-protected memories serve as message queues, allowing the cores to communicate with each other via IPC at the application level. However, the services and applications on the cores can run in parallel without interdependency and waiting on each other for hard real-time performance.

In an embodiment, one or more artificial intelligence (AI) models 117 can run on a virtual machine created by a hypervisor 177 on the MPU 103. The AI models 117 can be trained using data collected from MCUs in multiple ADVs and can then be applied to the ADV 101 for inference to maximize the performance of the VOS 102.

In the ADV 101, each MCU includes one or more hardware counters and one or more software counters that can be used to collect information from the ADV 101, such as vehicle temperature, power consumption, times of writing to the storage, and application tasks running. A system monitor can receive the collected information from the various counters. Some of the collected information may be manually labeled if necessary. The collected information can then be stored in a cloud for use in training the one or more AI models 117.

In an embodiment, the AI models 117 can be used for prediction and classification. For example, the AI models 117 can predict when the vehicle temperature can reach a peak based on information available, and accordingly schedule tasks to reduce the temperature in advance to prevent the vehicle from running in extremely high temperatures. Similarly, the AI models 117 can schedule application tasks in a manner to avoid excessive writes to the storage, and to avoid unnecessary power consumption to prolong the life of the battery in the ADV 101.

Figure 2:
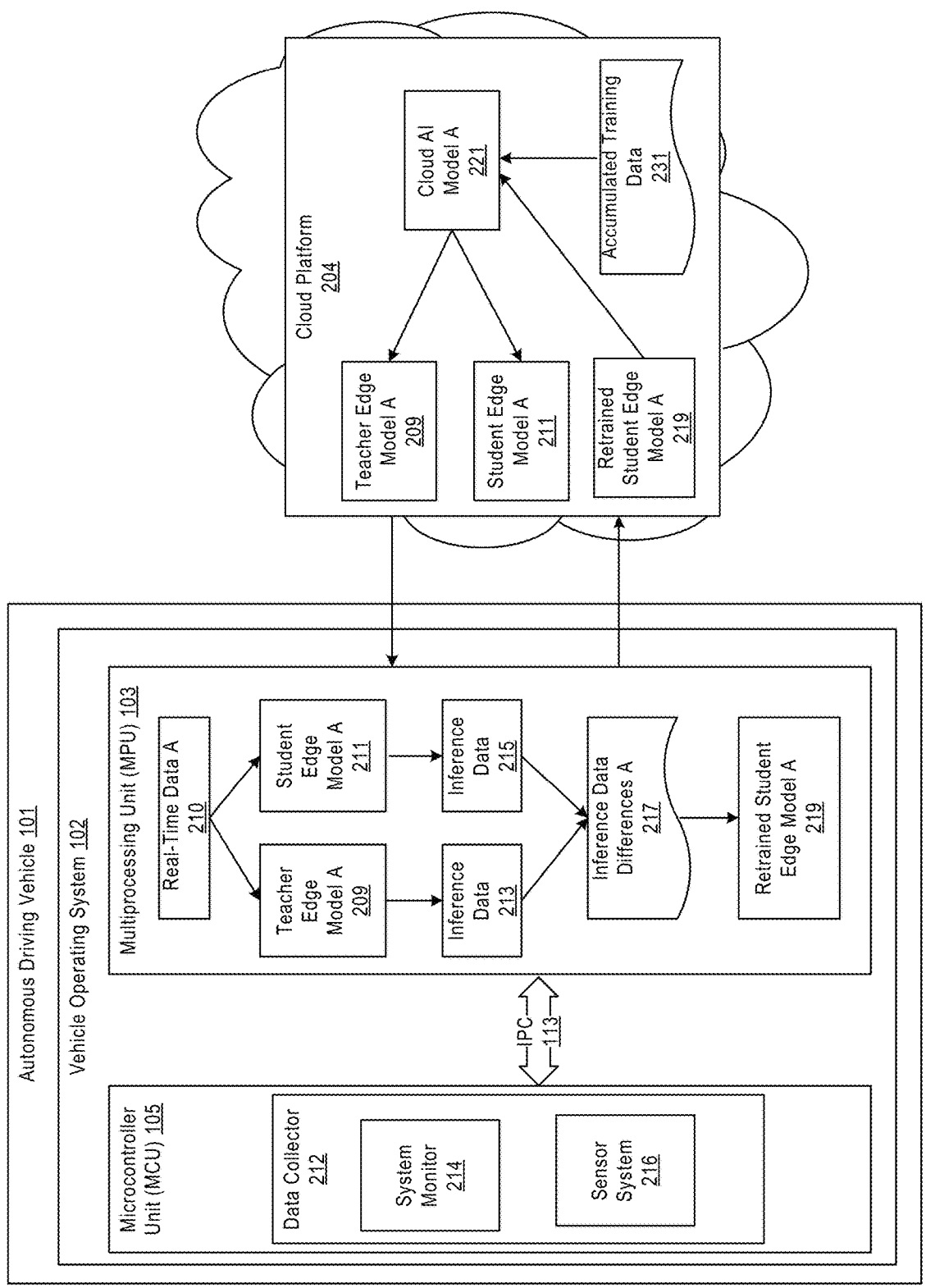
FIG. 2 illustrates interactions between a VOS and a cloud platform according to an embodiment of the invention.

FIG. 2 illustrates interactions between a VOS and a cloud platform according to an embodiment of the invention.

As shown in FIG. 2, the MPU 103 can include a teacher edge model A 209 and a student edge model A 211. Both models can be derived from a corresponding cloud AI model A 221 in a cloud platform 204 which the ADV 101 is communicatively coupled to, and are then deployed to the ADV 101. The cloud AI model A 221 is a comprehensive model that is more complex in structure (e.g., number of layers, and number of parameters, etc.). Both the teacher edge model A 209 and the student edge model A 211 are simplified versions of the cloud AI model A 221 for deployment to an edge device (e.g., the ADV 101). The student edge model A 211, however, is a simpler version than the teacher edge model A 209, and thus can be less accurate yet faster in inference. Therefore, the cloud AI model A 221, the student edge model A 209, and the teacher edge model A 211 all correspond to the same AI model, and but are different in structure and inference speed.

This figure uses just one AI model to illustrate its associated cloud model, teacher edge model, student edge, and their relationships. A skilled artisan would appreciate that as many as AI models as needed can be trained on the cloud platform 204, and that their associated student edge models and teacher edge models can be deployed to the ADV 101.

As shown in FIG. 2, the ADV 101 with the teacher edge model A 209 and the student edge 211 can collect real-time data 210 via a data collector 212 running on the MCU 105. The data collector 202 can include a system monitor 214 and a sensor system 216. The system monitor 214 can collect audit-logging information for each hardware component and each software component in the ADV 101. The audit-logging information can include the number of times the software component is called and attributes of each hardware component, e.g., the temperature of the hardware component. The sensor system 216 can collect sensor information from sensors on the ADV 101, e.g., cameras, LiDAR devices, etc. The information collected by the data collector 212 is generated by the ADV in real time while the ADV 101 is in motion. A skilled artisan would appreciate that the real-time data A 210 is input data to the student edge model and the teacher edge model, rather than any real-time data.

Both the teacher edge model A 209 and the student edge A 211 can take real-time data A 210 as input, and generate their respective inference data 213 and 215. When the inference data 213 and 215 are the same, the ADV 101 can take action based on the inference data 215 from the student edge model A 215. However, when the inference data 213 and 215 are different, the ADV 101 can take action based on the inference data 213 from the teacher edge model A 209.

Since both the teacher edge model A 209 and the student edge model A 211 are derived from the cloud AI model 221 that has been trained based on training data collected from multiple vehicles, the inference data 213 and 215 are expected to be the same most of the time. When they are different, as shown in FIG. 2, inference data differences A 217 can be used by the VOS 102 to retrain the student edge model A 211, such that the performance of the student edge model A 211 can approach the performance of the teacher edge model A 209.

Thus, the inference data differences 217 can practically be used in a loss function in refining the student edge model A 213. The refining process can include adjusting one or more parameter values of the student edge model A 211, which can a deep learning network, such as a convolutional neural network (CNN). The inference data 213 from the student edge model A 209 can thus be considered "soft ground truth", and the refining process can be considered a process of distilling knowledge (e.g., parameter values) in the teacher edge model A 209 to the student edge model A 211.

In an embodiment, after the student edge model A 211 is refined, it becomes a retrained student edge model A 219. Thereafter, the retrained student edge model A 219, instead of the student edge model A 211, can be used by the ADV 101 to perform the corresponding functions until a new version of the student edge model A 211 is deployed to the ADV 101 from the cloud platform 204.

In an embodiment, once the retrained student edge model A 219 is generated, the VOS 102 can immediately upload the model and the corresponding real-time data 210 labeled by the inference data 213 to the cloud platform 204, wherein the real-time data 210 can be saved to an accumulated training data repository 231.

In an embodiment, the cloud platform 204 can include a retrained student edge model A from each of a large number of ADVs running the teacher-student edge network structure. Similarly, the accumulated training data repository 231 can include labeled real-time data that causes the corresponding student edge model A to be retrained in each ADV.

At predetermined fixed intervals, the cloud platform 204 can update the student edge model A 211 and the teacher edge model A 209 based on labeled training data in the accumulated training data repository 231 in view of all the retrained student edge models from the ADVs.

In an embodiment, the updating of the student edge model A 211 and the teacher edge model A 209 can also be triggered when the total number of the retrained student edge models of the cloud AI model A 221 from the large number of ADVs reaches a threshold, or when the size of the training data in the accumulated training data repository 231 reaches a threshold. After the teacher edge model A 209 and the student edge model A 211 are updated, they can be deployed to each ADV to replace the existing teacher edge model and the existing student edge model in the ADV.

In an embodiment, the real-time data from each vehicle can be uploaded to the accumulated training data repository 231 together with the corresponding inference data from the teacher edge model. The real-time data is thus considered labeled data because the corresponding inference data from the teacher edge model is considered a "soft label".

In an embodiment, the cloud AI model A 221 can also be updated manually or automatically over predetermined fixed intervals based on the training data in the accumulated training data repository 231.

Therefore, the cloud platform 204 and the various ADVs communicatively coupled to the cloud platform 204 constitute a system that can automatically collect real-time training data, refine various teacher edge models and student edge models as well as the corresponding cloud model without user intervention.

Figure 3:
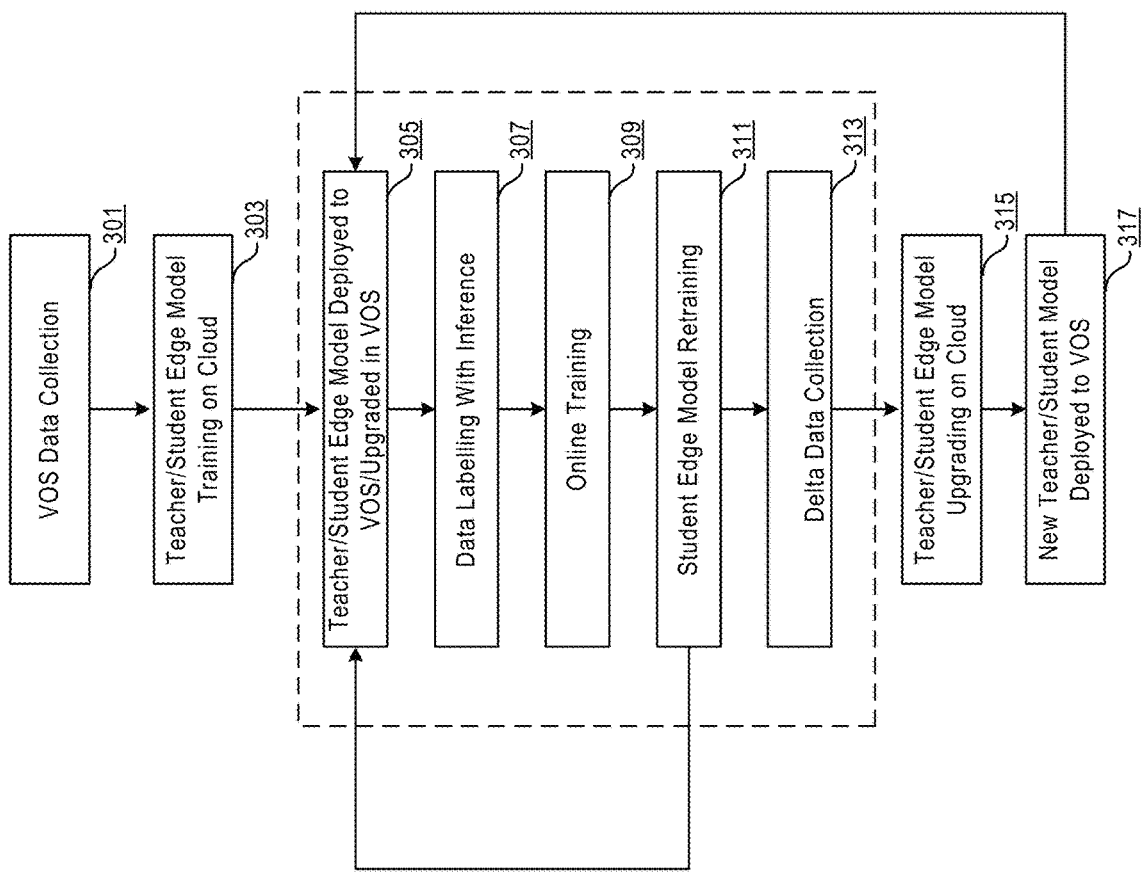
FIG. 3 illustrates a process of refining AI models in a VOS of an ADV according to an embodiment of the invention.

FIG. 3 illustrates a process of refining AI models in a VOS of an ADV according to an embodiment of the invention. The figure illustrates interactions between the cloud platform 204 and a particular ADV.

At block 301, ADVs with the same VOS collect audit-logging data (e.g., power consumption, temperatures, and performance) from the various hardware and software components, collect sensor data from various sensors on the ADVs, and upload the collected data to a cloud platform.

At block 303, the cloud platform trains a teacher edge model and a student edge model based on the collected data from the ADVs. In an embodiment, the cloud platform can first train a cloud AI model based on the collected data, and then generate a corresponding teacher edge model and a corresponding student edge model for deployment to each of the ADVs.

At block 305, the teacher edge model and the student edge model are deployed to each ADV.

At block 307, each ADV can run the student edge model and the teacher edge model on the same real-time data, and can generate their respective inference data. The inference process is also a labeling process, where both the teacher edge model and the student edge model labels the corresponding real-time data with their respective inference data. The labelling by the teacher edge model is considered more accurate than the student edge model. When there is any difference between the inference data from the two models, the ADV can use the inference data from the teacher edge mode and take action based on the inference data. When the inference data from the teacher edge model and the student edge model are the same, the ADV can use the inference data from the student edge model.

At block 309, the teacher edge model can retrain the student edge model online in the VOS based on the differences between their respective inference data. The inference data differences are losses that can be used in a loss function to tune the parameters in the student edge model such that the student edge model can get closer to the teacher edge model in terms of inference performance.

At block 311, the retrained student edge model can be redeployed through over-the-air update to the VOS to replace the existing student edge model. Thereafter, the ADV can use the retrained student edge model to perform inference for their preconfigured functions in operating the ADV. Alternatively, the ADV can continue use the existing student edge model until the existing student edge model is replaced by a new version from the cloud platform.

At block 313, the ADV can collect the delta data, which include real-time data that causes the student edge model to be retrained and corresponding reference data from the teacher edge model. The delta data is thus labeled training data, i.e., real-time data labeled by inference data from the teacher edge model. In an embodiment, the delta data can include such labelled real-time data in the past period of time, e.g., the last 30 minutes or in the last hour.

At block 315, the cloud platform can receive such labeled real-time data from many ADVs, and can upgrade the teacher edge model and the student edge model based on the labeled real-time data (labeled training data) from the ADVs.

At block 317, the cloud platform, after updating the student edge model and the teacher edge model, can push the updated models to each ADV.

Figure 4:
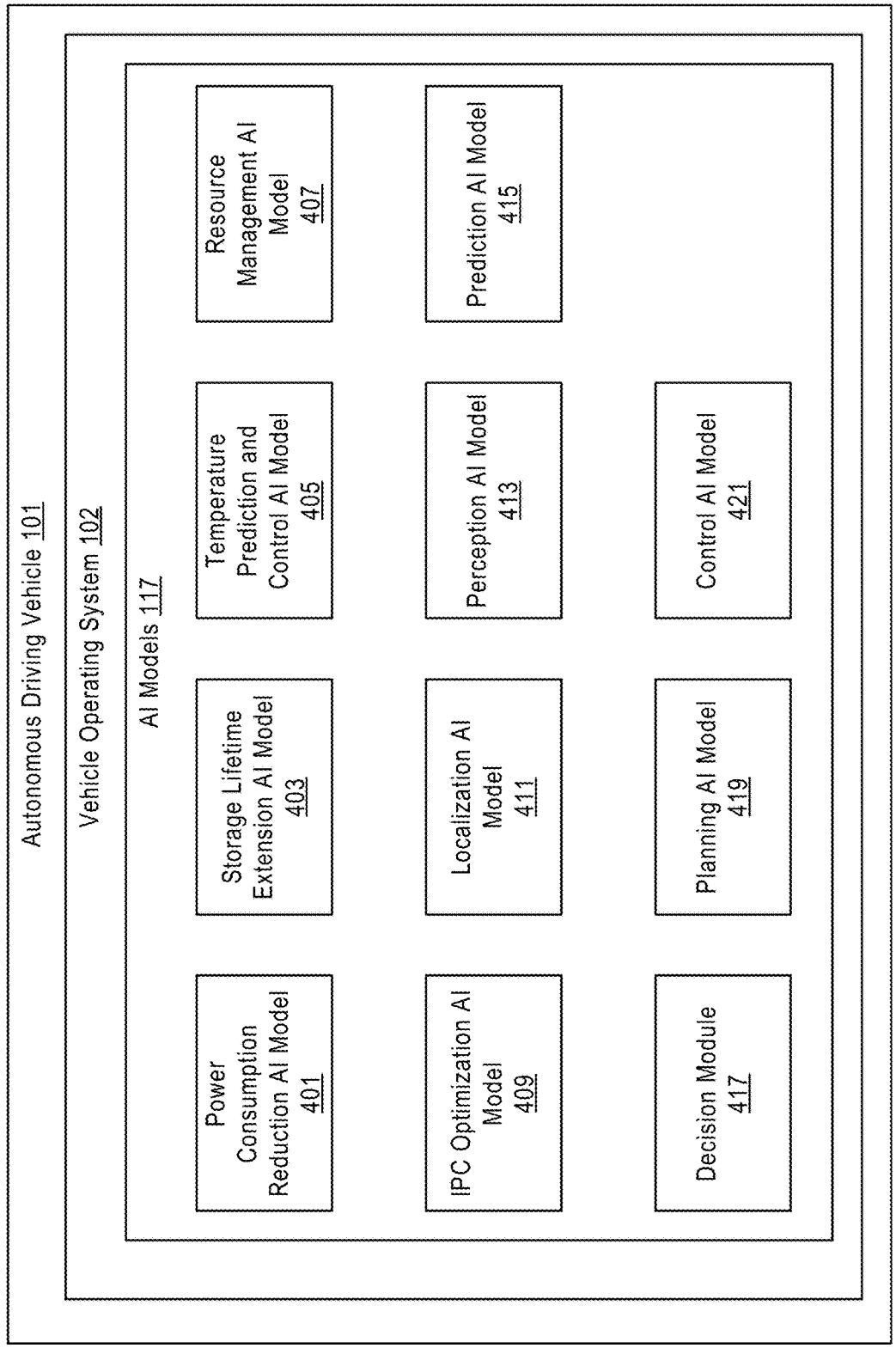
FIG. 4 illustrates the various AI models deployed to the VOS of the ADV according to an embodiment of the invention.

FIG. 4 illustrates the various AI models deployed to the VOS of the ADV according to an embodiment of the invention.

As shown, the ADV 101 can include a power consumption reduction AI model 401, a storage life extension AI model 403, a temperature prediction and control AI model 405, a resource management AI model 407, an IPC optimization AI model 409, a localization AI model 411, a perception AI model 413, a prediction AI model 415, a decision AI model 417, a planning AI model 419, and a control AI model 412.

In an embodiment, each of the AI models 401-421 are represented by a student edge model and a teacher edge model in the ADV 101, and also has a corresponding teacher edge model, a corresponding student edge model as well as a corresponding cloud model on the cloud platform 204.

The AI models 411-421 each perform one or more functions in the autonomous driving of the ADV 101, and the functions of each AI model are described in detail later in the disclosure in FIG. 9A and FIG. 9B.

In an embodiment, the power consumption reduction AI model 401 can be a deep learning neural network configured to classify tasks into different levels, with each level corresponding to a power consumption cap. In this embodiment, a task can be defined as a sequence of operations. An example of a task is a sequence of operations for classifying a captured image. The example task can include the following operations: the camera capturing an image, the image signal processing (ISP) component processing the image, and an application classifying the image based on its content. This sequence of operations is safety-critical and thus is classified as a level-1 task, and is given a highest limit/cap in terms of power consumption.

The power consumption reduction AI model 401 can classify different sequences of operations into different levels of tasks with different power consumption caps. The power consumption caps for the tasks are based on historical power consumption data of the task. The power consumption reduction AI model 401 can ensure that the ADV 101 still operate safely without any task exceeding its allocated power consumption caps.

The storage life extension AI model 403 can identify one or more available operation sequence that may achieve the same write task, and can select the operation sequence entailing the smallest write to a storage medium to extend its lifetime. Each operation sequence may entail a number of writes to the storage medium based on the number of APIs calls for writing to the storage medium.

For example, the following two operation sequences can achieve the same purpose-writing captured image data from 10 cameras into a storage. The first operation sequence include writing image data from each cameras separately, which requires 10 writes to the storage medium, and the other operation sequence include combining the image data from the 10 cameras and writing the combined image data to the storage medium, which requires 1 write. The storage life extension AI model 403 can select the second operation sequence.

The temperature prediction and control AI model 405 can predict when an MPU (e.g., a CPU or a GPU) can reach an undesired temperature based on a sequence of computational operations that the MPU is to execute, and suggests a different sequence of computational operations to avoid the MPU from reaching that undesired temperature level.

For example, Task 1 includes computational operation A, computational operation B, and computational C; and task 2 includes computational operation D, computational operation E, and computational task F. If the temperature prediction and control AI model 405 predicts that the consecutive execution of all the computational operations in task 1 would cause the MPU to reach the undesired temperature level, the VOS can delay the execution of one or more computational operation in task 1. For example, the VOS can schedule the execution of computational operation E and computational operation F after computational operation A, instead of scheduling the execution of computational operation B and computational operation C, to avoid the problematic operation sequence.

Similarly, the resource management AI model 407 can identify multiple sequences of operations for achieving the same functions, and selects the sequence that consumes least resources (e.g., memory, I/Os, etc).

The IPC optimization AI model 409 can identify multiple communication channels between the MPU and an MCU, and select a communications channel either with the fast speed or the highest throughput based on a number of factors, including traffic in each communication channel, and priority of the task associated with the data transfer. The IPC communications can be conducted via a number of communications channels, including peripheral component interconnect (PCIe) and Ethernet.

Figure 5:
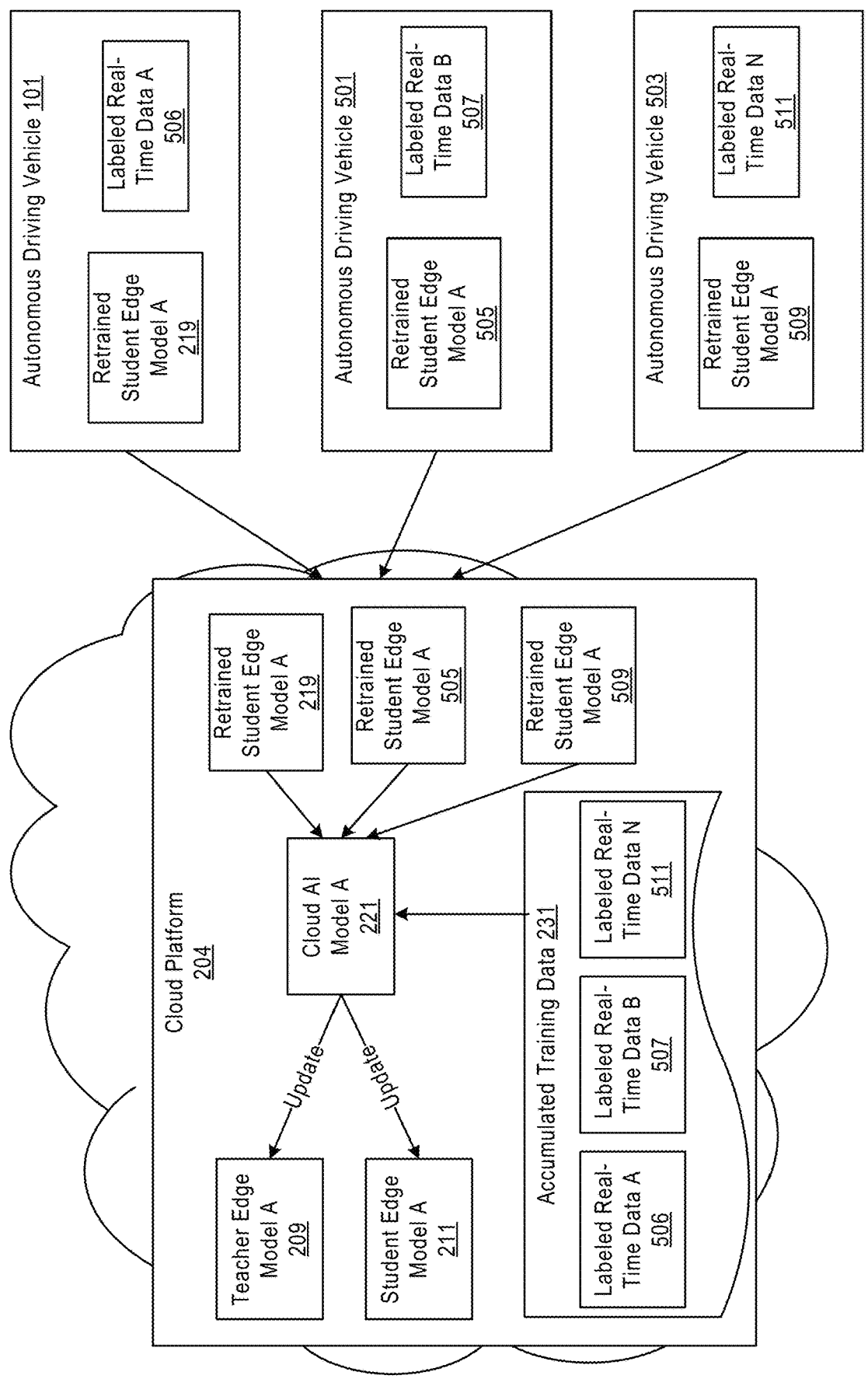
FIG. 5 further illustrates the cloud platform in communication with multiple ADVs according to an embodiment of the invention.

FIG. 5 further illustrates the cloud platform 204 in communication with multiple ADVs according to an embodiment of the invention.

As shown in FIG. 5, multiple ADVs 101, 501, and 503 can be communicatively coupled to the cloud platform 204, and each of the ADV can include a teacher edge model A and a student edge model A that can then be retrained on the ADV online automatically based on real-time data collected while the ADV is in motion or running.

As shown, each retrained student edge model A 219, 505 and 509 can be uploaded to the cloud platform 204. At the same time, labeled real-time data 506, 507, and 511 corresponding to the retrained student edge models 219, 505, and 509 can be uploaded and saved to the accumulated training data repository 231. The labeled real-time data 506, 507, and 511 are considered labeled by the corresponding teacher edge model using "soft labels" as described earlier in the disclosure.

The cloud AI model A 221 can use labeled real-time data in the accumulated training data repository 231 and the retrained student edge models 219, 505, and 509 to update the teacher edge model A 209 and the student edge model A 211. The updated teacher edge model A 209 and the updated student edge model A 211 can be redeployed to each ADV to replace the existing teacher edge model and the existing student edge model in the ADV.

Figure 6:
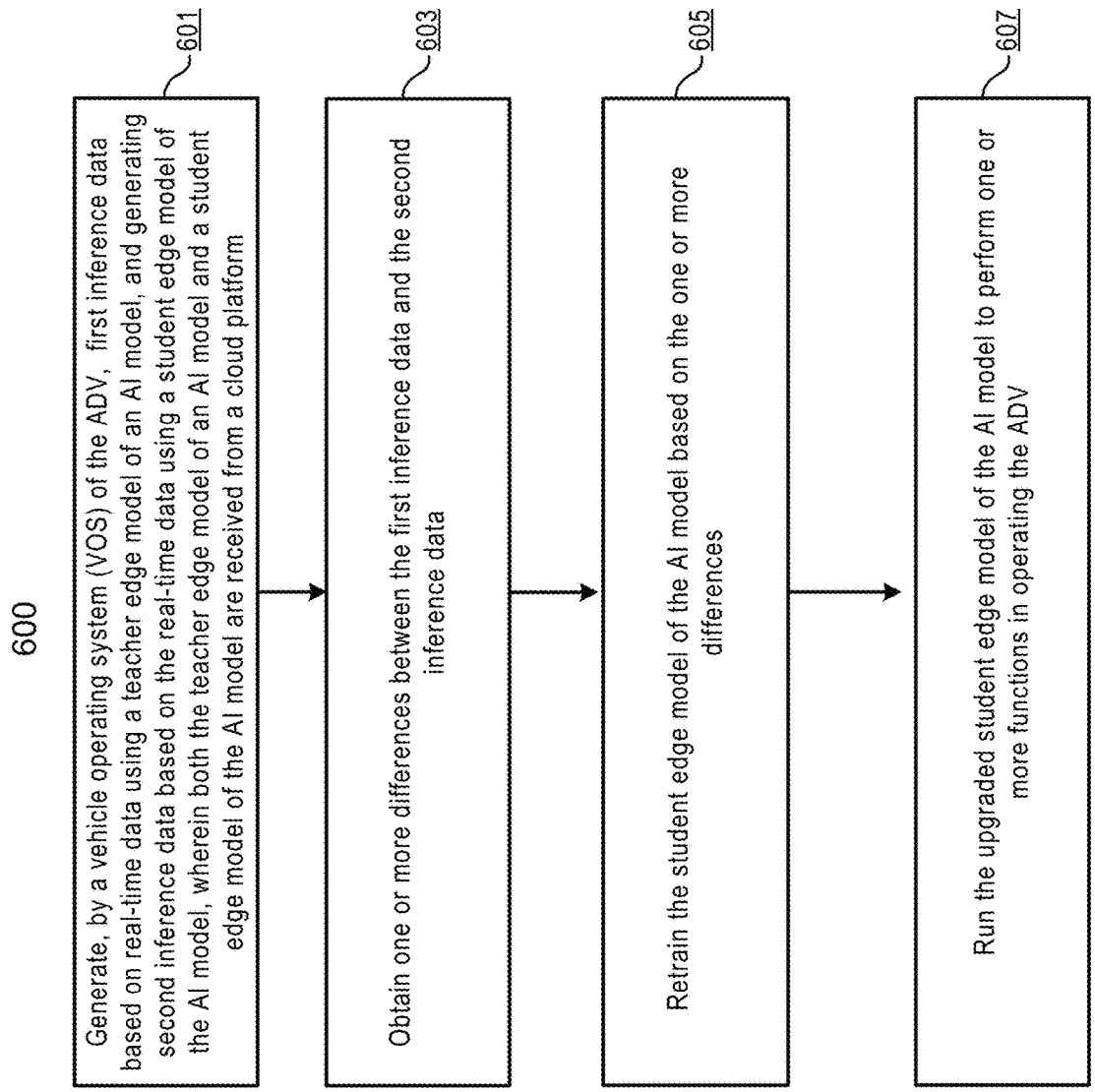
FIG. 6 illustrates a process of training an artificial intelligence (AI) model in an ADV according to an embodiment of the invention.

FIG. 6 illustrates a process 600 of training an artificial intelligence (AI) model in an autonomous driving vehicle (ADS). The process 600 can be performed by a processing logic that includes a software or a hardware component or a combination thereof. For example, the processing logic can include the MPU 103 described in FIG. 2.

In operation 601, the processing logic generates first inference data based on real-time data using a teacher edge model of an AI model, and generates second inference data based on the real-time data using a student edge model of the AI model. Both the teacher edge model and a student edge model are received from a cloud platform. In operation 603, the processing logic obtains one or more differences between the first inference data and the second inference data. In operation 605, the processing logic retrains the student edge model based on the one or more differences. In operation 607, the processing logic runs the upgraded student edge model of the AI model to perform one or more functions in operating the ADV.

Figure 7:
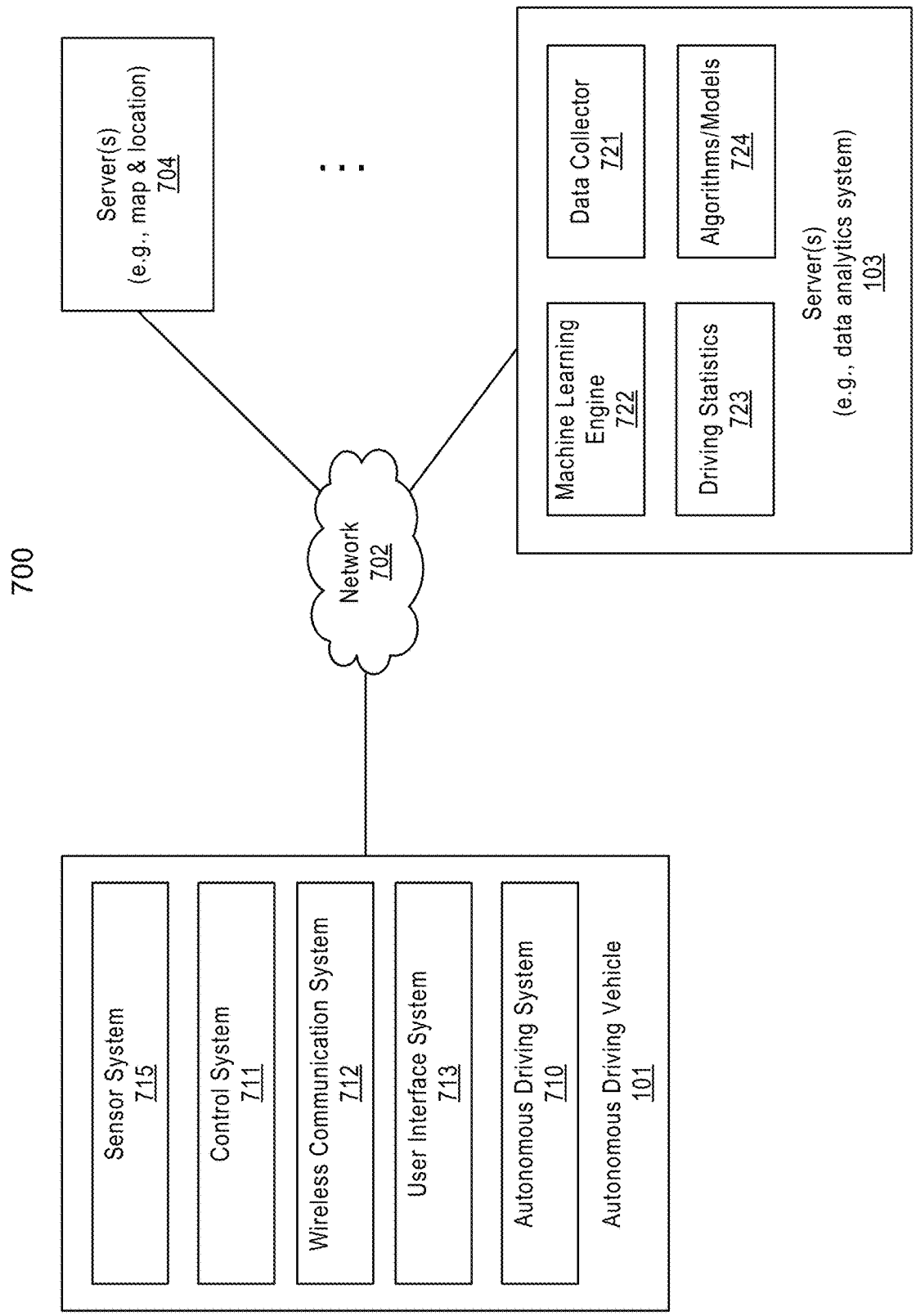
FIG. 7 is a block diagram illustrating an autonomous driving network configuration according to one embodiment of the disclosure.

FIG. 7 is a block diagram illustrating an autonomous driving network configuration according to one embodiment of the disclosure. Referring to FIG. 7, network configuration 700 includes autonomous driving vehicle (ADV) 101 that may be communicatively coupled to one or more servers 703-704 over a network 702. Although there is one ADV shown, multiple ADVs can be coupled to each other and/or coupled to servers 703-704 over network 702. Network 702 may be any type of networks such as a local area network (LAN), a wide area network (WAN) such as the Internet, a cellular network, a satellite network, or a combination thereof, wired or wireless. Server(s) 703-704 may be any kind of servers or a cluster of servers, such as Web or cloud servers, application servers, backend servers, or a combination thereof. Servers 703-704 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 710, vehicle control system 711, wireless communication system 712, user interface system 713, and sensor system 715. ADV 101 may further include certain common components included in ordinary vehicles, such as, an engine, wheels, steering wheel, transmission, etc., which may be controlled by vehicle control system 711 and/or ADS 710 using a variety of communication signals and/or commands, such as, for example, acceleration signals or commands, deceleration signals or commands, steering signals or commands, braking signals or commands, etc.

Components 710-715 may be communicatively coupled to each other via an interconnect, a bus, a network, or a combination thereof. For example, components 710-715 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 8:
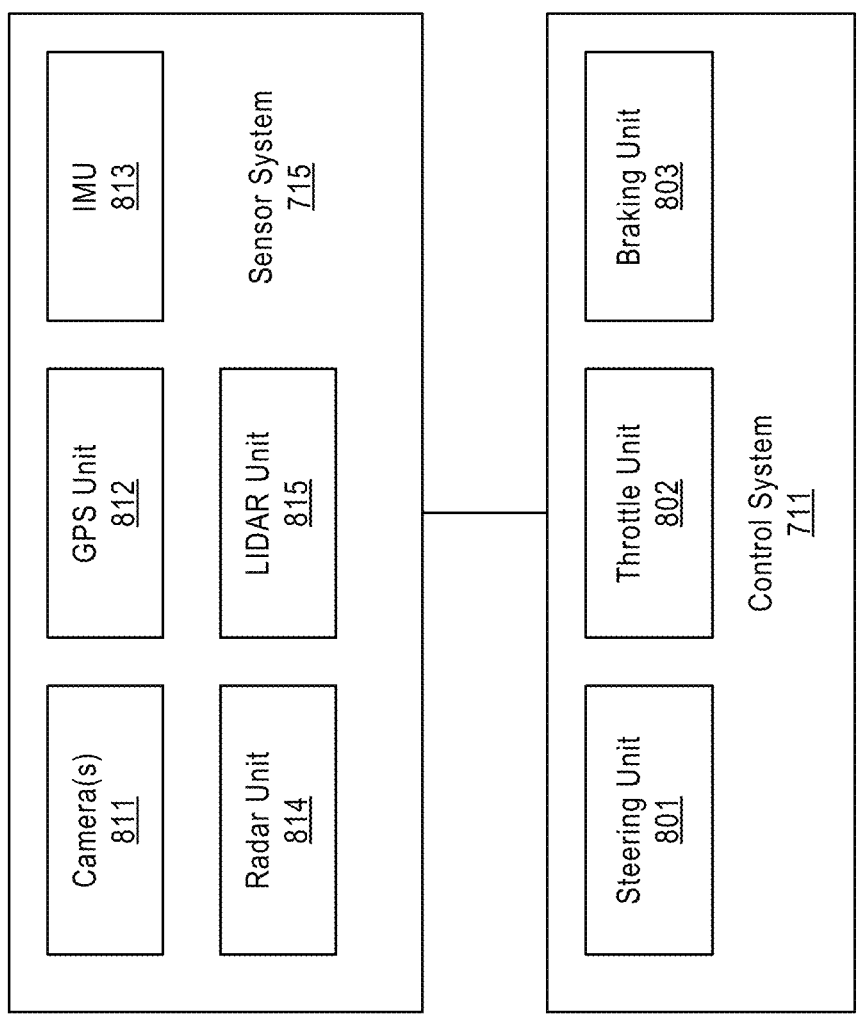
FIG. 8 illustrates a sensor control system of the ADV according to an embodiment of the invention.

Referring now to FIG. 8, in one embodiment, sensor system 715 includes, but it is not limited to, one or more cameras 811, global positioning system (GPS) unit 812, inertial measurement unit (IMU) 813, radar unit 814, and a light detection and range (LIDAR) unit 815. GPS system 812 may include a transceiver operable to provide information regarding the position of the ADV. IMU unit 813 may sense position and orientation changes of the ADV based on inertial acceleration. Radar unit 814 may represent a system that utilizes radio signals to sense objects within the local environment of the ADV. In some embodiments, in addition to sensing objects, radar unit 814 may additionally sense the speed and/or heading of the objects. LIDAR unit 815 may sense objects in the environment in which the ADV is located using lasers. LIDAR unit 815 could include one or more laser sources, a laser scanner, and one or more detectors, among other system components. Cameras 811 may include one or more devices to capture images of the environment surrounding the ADV. Cameras 811 may be still cameras and/or video cameras. A camera may be mechanically movable, for example, by mounting the camera on a rotating and/or tilting a platform.

Sensor system 715 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 711 includes, but is not limited to, steering unit 801, throttle unit 802 (also referred to as an acceleration unit), and braking unit 803. Steering unit 801 is to adjust the direction or heading of the vehicle. Throttle unit 802 is to control the speed of the motor or engine that in turn controls the speed and acceleration of the vehicle. Braking unit 803 is to decelerate the vehicle by providing friction to slow the wheels or tires of the vehicle. Note that the components as shown in FIG. 8 may be implemented in hardware, software, or a combination thereof.

Referring back to FIG. 7, wireless communication system 712 is to allow communication between ADV 101 and external systems, such as devices, sensors, other vehicles, etc. For example, wireless communication system 712 can wirelessly communicate with one or more devices directly or via a communication network, such as servers 703-704 over network 702. Wireless communication system 712 can use any cellular communication network or a wireless local area network (WLAN), e.g., using WiFi to communicate with another component or system. Wireless communication system 712 could communicate directly with a device (e.g., a mobile device of a passenger, a display device, a speaker within vehicle 101), for example, using an infrared link, Bluetooth, etc. User interface system 713 may be part of peripheral devices implemented within vehicle 101 including, for example, a keyboard, a touch screen display device, a microphone, and a speaker, etc.

Some or all of the functions of ADV 101 may be controlled or managed by ADS 710, especially when operating in an autonomous driving mode. ADS 710 includes the necessary hardware (e.g., processor(s), memory, storage) and software (e.g., operating system, planning and routing programs) to receive information from sensor system 715, control system 711, wireless communication system 712, and/or user interface system 713, process the received information, plan a route or path from a starting point to a destination point, and then drive vehicle 101 based on the planning and control information. Alternatively, ADS 710 may be integrated with vehicle control system 711.

For example, a user as a passenger may specify a starting location and a destination of a trip, for example, via a user interface. ADS 710 obtains the trip related data. For example, ADS 710 may obtain location and route data from an MPOI server, which may be a part of servers 703-704. The location server provides location services and the MPOI server provides map services and the POIs of certain locations. Alternatively, such location and MPOI information may be cached locally in a persistent storage device of ADS 710.

While ADV 101 is moving along the route, ADS 710 may also obtain real-time traffic information from a traffic information system or server (TIS). Note that servers 703-704 may be operated by a third party entity. Alternatively, the functionalities of servers 703-704 may be integrated with ADS 710. Based on the real-time traffic information, MPOI information, and location information, as well as real-time local environment data detected or sensed by sensor system 715 (e.g., obstacles, objects, nearby vehicles), ADS 710 can plan an optimal route and drive vehicle 101, for example, via control system 711, according to the planned route to reach the specified destination safely and efficiently.

In an embodiment, one or more of servers 703-704 can be in the cloud and be part of the cloud platform 204.

Server 703 may be a data analytics system to perform data analytics services for a variety of clients. In one embodiment, data analytics system 703 includes data collector 721 and machine learning engine 722. Data collector 721 collects driving statistics 723 from a variety of vehicles, either ADVs or regular vehicles driven by human drivers. Driving statistics 723 include information indicating the driving commands (e.g., throttle, brake, steering commands) issued and responses of the vehicles (e.g., speeds, accelerations, decelerations, directions) captured by sensors of the vehicles at different points in time. Driving statistics 723 may further include information describing the driving environments at different points in time, such as, for example, routes (including starting and destination locations), MPOIs, road conditions, weather conditions, etc.

Based on driving statistics 723, machine learning engine 722 generates or trains a set of rules, algorithms, and/or predictive models 724 for a variety of purposes. In one embodiment, algorithms 724 may include can include cloud versions of the AI models 401-421 described in FIG. 4.

Figure 9A:
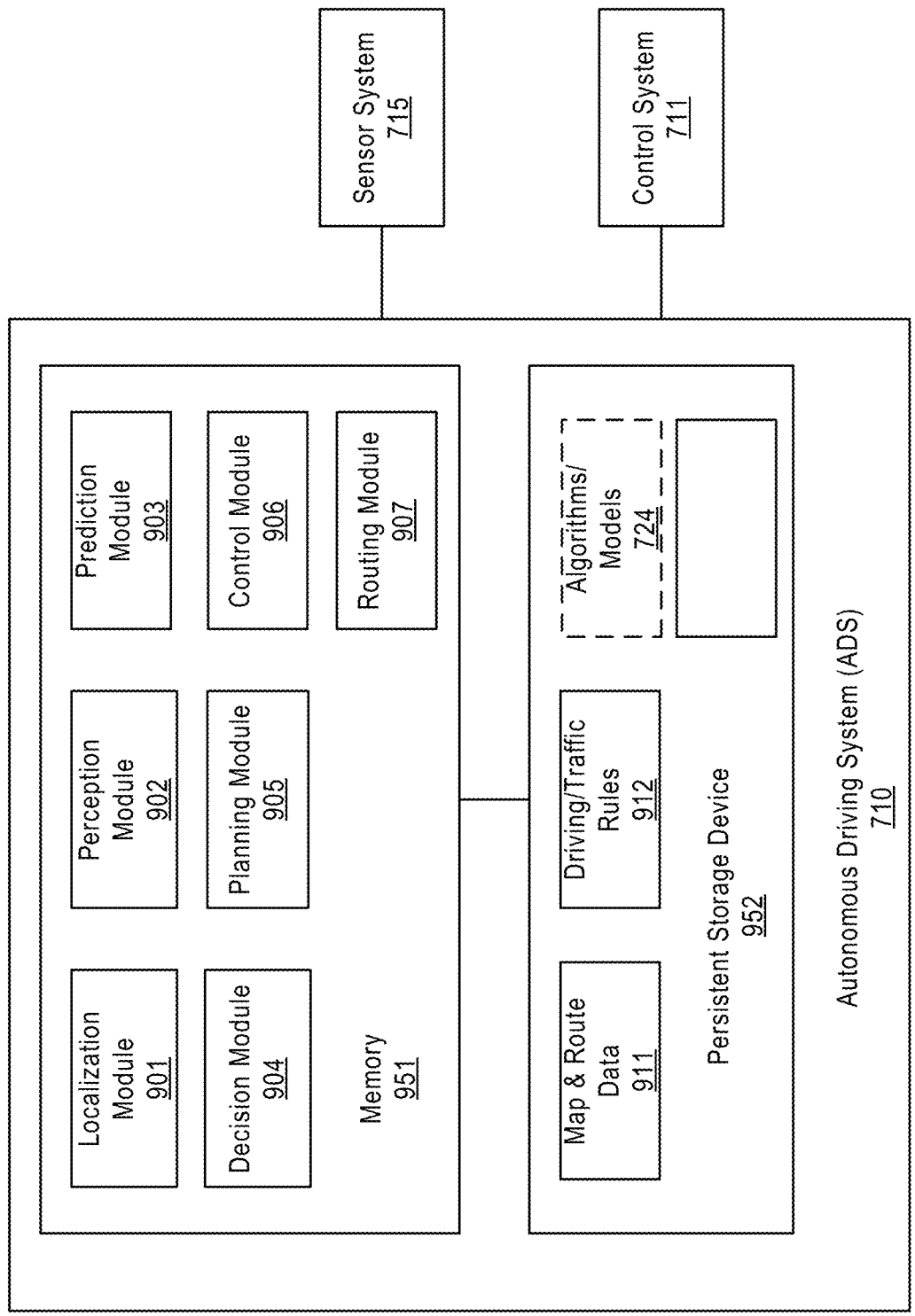
FIGS. 9A and 9B are block diagrams illustrating an example of the ADS and modules therein according to some embodiments of the invention.
Figure 9B:
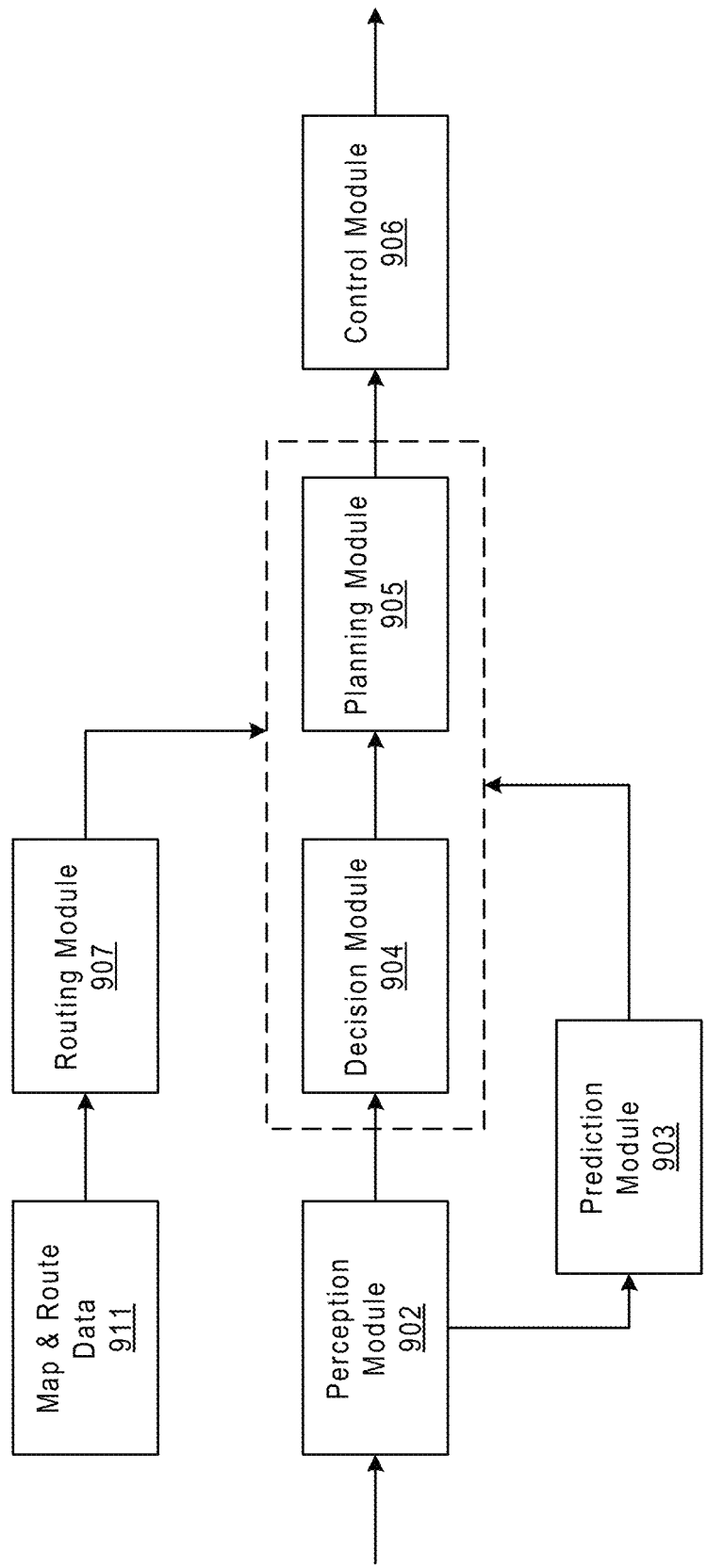

FIGS. 9A and 9B are block diagrams illustrating an example of an autonomous driving system used with an ADV according to one embodiment. The ADS 710 may be implemented as a part of ADV 101 of FIG. 7. Referring to FIGS. 9A-9B, ADS 710 includes, but is not limited to, localization module 901, perception module 902, prediction module 903, decision module 904, planning module 905, control module 906, routing module 907. These modules can be implemented as an AI models. FIG. 3 shows some of the modules that are implemented as AI models.

Some or all of modules 901-907 may be implemented in software, hardware, or a combination thereof. For example, these modules may be installed in persistent storage device 752, loaded into memory 751, and executed by one or more processors (not shown). Note that some or all of these modules may be communicatively coupled to or integrated with some or all modules of vehicle control system 711 of FIG. 8. Some of modules 901-907 may be integrated together as an integrated module.

Localization module 901 determines a current location of ADV 101 (e.g., leveraging GPS unit 812) and manages any data related to a trip or route of a user. Localization module 901 (also referred to as a map and route module) manages any data related to a trip or route of a user. A user may log in and specify a starting location and a destination of a trip, for example, via a user interface. Localization module 901 communicates with other components of ADV 101, such as map and route data 911, to obtain the trip related data. For example, localization module 901 may obtain location and route data from a location server and a map and POI (MPOI) server. A location server provides location services and an MPOI server provides map services and the POIs of certain locations, which may be cached as part of map and route data 911. While ADV 101 is moving along the route, localization module 901 may also obtain real-time traffic information from a traffic information system or server.

Based on the sensor data provided by sensor system 715 and localization information obtained by localization module 901, a perception of the surrounding environment is determined by perception module 902. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 902 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 902 can also detect objects based on other sensors data provided by other sensors such as a radar and/or LIDAR.

For each of the objects, prediction module 903 predicts what the object will behave under the circumstances. The prediction is performed based on the perception data perceiving the driving environment at the point in time in view of a set of map/route information 911 and traffic rules 912. For example, if the object is a vehicle at an opposing direction and the current driving environment includes an intersection, prediction module 903 will predict whether the vehicle will likely move straight forward or make a turn. If the perception data indicates that the intersection has no traffic light, prediction module 903 may predict that the vehicle may have to fully stop prior to enter the intersection. If the perception data indicates that the vehicle is currently at a left-turn only lane or a right-turn only lane, prediction module 903 may predict that the vehicle will more likely make a left turn or right turn respectively.

For each of the objects, decision module 904 makes a decision regarding how to handle the object. For example, for a particular object (e.g., another vehicle in a crossing route) as well as its metadata describing the object (e.g., a speed, direction, turning angle), decision module 904 decides how to encounter the object (e.g., overtake, yield, stop, pass). Decision module 904 may make such decisions according to a set of rules such as traffic rules or driving rules 912, which may be stored in persistent storage device 952.

Routing module 907 is configured to provide one or more routes or paths from a starting point to a destination point. For a given trip from a start location to a destination location, for example, received from a user, routing module 907 obtains route and map information 911 and determines all possible routes or paths from the starting location to reach the destination location. Routing module 907 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 904 and/or planning module 905. Decision module 904 and/or planning module 905 examine all of the possible routes to select and modify one of the most optimal routes in view of other data provided by other modules such as traffic conditions from localization module 901, driving environment perceived by perception module 902, and traffic condition predicted by prediction module 903. The actual path or route for controlling the ADV may be close to or different from the reference line provided by routing module 907 dependent upon the specific driving environment at the point in time.

Based on a decision for each of the objects perceived, planning module 905 plans a path or route for the ADV, as well as driving parameters (e.g., distance, speed, and/or turning angle), using a reference line provided by routing module 907 as a basis. That is, for a given object, decision module 904 decides what to do with the object, while planning module 905 determines how to do it. For example, for a given object, decision module 904 may decide to pass the object, while planning module 905 may determine whether to pass on the left side or right side of the object. Planning and control data is generated by planning module 905 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 906 controls and drives the ADV, by sending proper commands or signals to vehicle control system 711, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 905 plans a next route segment or path segment, for example, including a target position and the time required for the ADV to reach the target position. Alternatively, planning module 905 may further specify the specific speed, direction, and/or steering angle, etc. In one embodiment, planning module 905 plans a route segment or path segment for the next predetermined period of time such as 5 seconds. For each planning cycle, planning module 905 plans a target position for the current cycle (e.g., next 5 seconds) based on a target position planned in a previous cycle. Control module 906 then generates one or more control commands (e.g., throttle, brake, steering control commands) based on the planning and control data of the current cycle.

Note that decision module 904 and planning module 905 may be integrated as an integrated module. Decision module 904/planning module 905 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 713. The navigation system may update the driving path dynamically while the ADV is in operation. The navigation system can incorporate data from a GPS system and one or more maps so as to determine the driving path for the ADV.

Figure 10A:
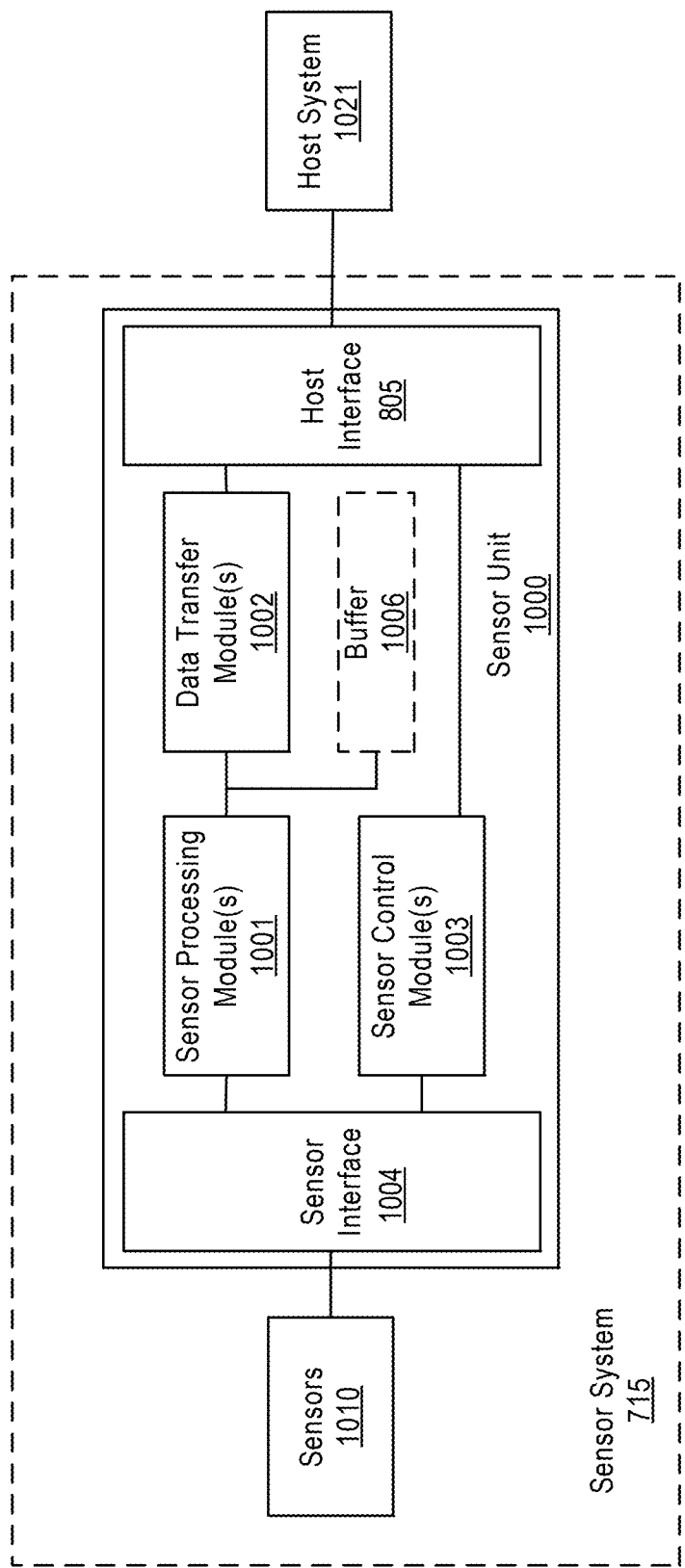
FIGS. 10A and 10B are block diagrams illustrating an example of a sensor unit according to one embodiment.

FIG. 10A is a block diagram illustrating an example of a sensor system according to one embodiment of the invention. Referring to FIG. 10A, sensor system 715 includes a number of sensors 1010 and a sensor unit 1000 coupled to host system 1021. Host system 1021 represents a planning and control system as described above, which may include at least some of the modules as shown in FIG. 9A. Sensor unit 1000 may be implemented in a form of an FPGA device or an ASIC (application specific integrated circuit) device. In one embodiment, sensor unit 1000 includes, amongst others, one or more sensor data processing modules 801 (also simply referred to as sensor processing modules), data transfer modules 802, and sensor control modules or logic 1003. Modules 1001-1003 can communicate with sensors 1010 via a sensor interface 1004 and communicate with host system 1021 via host interface 1005. Optionally, an internal or external buffer 806 may be utilized for buffering the data for processing.

In one embodiment, for the receiving path or upstream direction, sensor processing module 1001 is configured to receive sensor data from a sensor via sensor interface 804 and process the sensor data (e.g., format conversion, error checking), which may be temporarily stored in buffer 1006. Data transfer module 1002 is configured to transfer the processed data to host system 1021 using a communication protocol compatible with host interface 1005. Similarly, for the transmitting path or downstream direction, data transfer module 1002 is configured to receive data or commands from host system 1021. The data is then processed by sensor processing module 1001 to a format that is compatible with the corresponding sensor. The processed data is then transmitted to the sensor.

In one embodiment, sensor control module or logic 1003 is configured to control certain operations of sensors 1010, such as, for example, timing of activation of capturing sensor data, in response to commands received from host system (e.g., perception module 902) via host interface 1005. Host system 1021 can configure sensors 1010 to capture sensor data in a collaborative and/or synchronized manner, such that the sensor data can be utilized to perceive a driving environment surrounding the vehicle at any point in time.

Sensor interface 1004 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 805 may be any high speed or high bandwidth interface such as PCIe (peripheral component interconnect or PCI express) interface. Sensors 810 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 1000. The serial interface such as UART can be coupled with a console system for debug purposes.

Note that sensors 1010 can be any kind of sensors and provided by various vendors or suppliers. Sensor processing module 1001 is configured to handle different types of sensors and their respective data formats and communication protocols. According to one embodiment, each of sensors 1010 is associated with a specific channel for processing sensor data and transferring the processed sensor data between host system 1021 and the corresponding sensor. Each channel includes a specific sensor processing module and a specific data transfer module that have been configured or programmed to handle the corresponding sensor data and protocol, as shown in FIG. 10B.

Figure 10B:
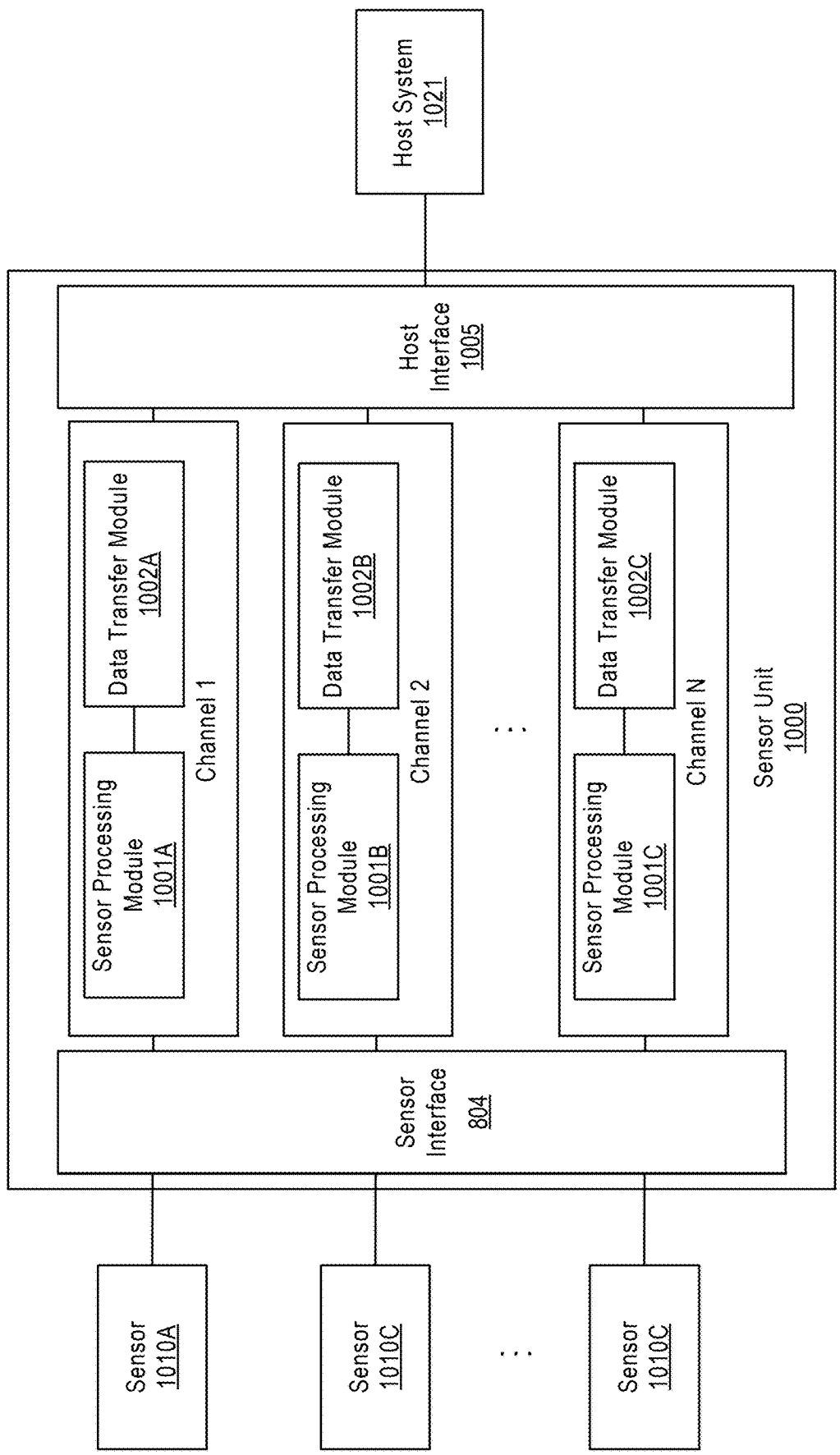

Referring now to FIG. 10B, sensor processing modules 1001A-1001C are specifically configured to process sensor data obtained from sensors 810A-810C respectively. Note that sensors 1010A-1010C may the same or different types of sensors. Sensor processing modules 1001A-1001C can be configured (e.g., software configurable) to handle different sensor processes for different types of sensors. For example, if sensor 1010A is a camera, processing module 1001A can be figured to handle pixel processing operations on the specific pixel data representing an image captured by camera 1010A. Similarly, if sensor 1010A is a LIDAR device, processing module 1001A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 1002A-1002C can be configured to operate in different modes, as different kinds of sensor data may be in different size or sensitivities that require different speed or timing requirement. According to one embodiment, each of data transfer modules 1002A-1002C can be configured to operate in one of a low latency mode, a high bandwidth mode, and a memory mode (also referred to as a fixed memory mode).

When operating in a low latency mode, according to one embodiment, a data transfer module (e.g., data transfer module 1002) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 1002) is configured to accumulate the sensor data received from a sensor up to a predetermined amount, but is still within the bandwidth the connection between the data transfer module and the host system 1021. The accumulated sensor data is then transferred to the host system 1021 in a batch that maximum the bandwidth of the connection between the data transfer module and host system 1021. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 1021, similar to a shared memory page. Examples of the sensor data to be transferred using memory mode include system status data such as temperature, fans speed, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of training an artificial intelligence (AI) model in an autonomous driving vehicle (ADV) that is in motion, comprising:
    generating, by a vehicle operating system (VOS) executed by a processor of the ADV, first inference data based on real-time data using a teacher edge model of an AI model, and generating second inference data based on the real-time data using a student edge model of the AI model, wherein both the teacher edge model of the AI model and the student edge model of the AI model are received from a cloud platform;
    obtaining one or more differences between the first inference data and the second inference data; and
    retraining the student edge model of the AI model based on the one or more differences,
    wherein the VOS of the ADV, is configured to run the retrained student edge model of the AI model to perform one or more functions in operating the ADV, including running the retrained student edge model of the AI model to operate the ADV to reduce power consumption by the ADV based on the AI model.

2. The method of claim 1, further comprising:
    uploading, by the VOS of the ADV, the real-time data labeled by the first inference data, and the retrained student edge model to the cloud platform, wherein a cloud model of the AI model is configured to retrain the teacher edge model and the student edge model based at least partly on the labeled real-time data in view of the retrained student edge model of the AI model.

3. The method of claim 1, further comprising:
    receiving, by the VOS of the ADV, the retrained teacher edge model and the retrained student edge model from the cloud platform; and
    replacing, by the VOS of the ADV, the teacher edge model and the student edge model in the ADV respectively with the retrained teacher edge model and the retrained student edge model.

4. The method of claim 1, wherein the real-time data is collected by a system monitor in the VOS or by one or more sensors in the ADV.

5. The method of claim 1, wherein the AI model is one of a plurality of AI models deployed to the VOS of the ADV, wherein the plurality of AI models include a power consumption reduction AI model, a storage life extension AI model, a temperature prediction and control AI model, a resource management AI model, an IPC optimization AI model, a perception AI model, a localization AI model, a prediction AI model, a decision AI model, a planning AI model, and a control AI model.

6. The method of claim 5, wherein each of the plurality of AI models is a deep learning neural network.

7. The method of claim 5, wherein the power consumption reduction AI model is configured to classify a task as a task with a priority level, wherein the priority level corresponds to a power consumption limit.

8. The method of claim 5, wherein the storage life extension AI model is configured to select a path that requires a smallest number of writes to a storage medium when a plurality of paths are available.

9. The method of claim 5, wherein the temperature prediction and control AI model is configured to predict that a sequence of applications is to cause a temperature of a multiprocessor unit (MPU) to reach a predetermined level, and to schedule a different sequence of applications so as to avoid the temperature from reaching the predetermined level.

10. The method of claim 5, wherein the IPC optimization AI model is configured to select a communications channel between a multiprocessor unit (MPU) and a microcontroller unit (MCU) based on a number of factors, including traffic in a data path and a priority level of a task associated with a data transfer.

11. A vehicle operating system (VOS) of an autonomous driving vehicle (ADV), comprising:
one or more microcontroller units (MCUs), wherein each MCU includes a data collectors configured to collect real-time data from the ADV that is in motion;
a microprocessor unit (MPU), wherein the MPU includes program instructions, which, when executed, cause the VOS to perform operation comprising:
generating first inference data using a teacher edge model of an AI model based on the real-time data, and generating second inference data using a student edge model of the AI model based on the real-time data, wherein both the teacher edge model of the AI model and the student edge model of the AI model are received from a cloud platform;
obtaining one or more differences between the first inference data and the second inference data; and
retraining the student edge model of the AI model based on the one or more differences,
wherein the VOS of the ADV, is configured to run the retrained student edge model of the AI model to perform one or more functions in operating the ADV, including running the retrained student edge model of the AI model to operate the ADV to reduce power consumption by the ADV based on the AI model.

12. The VOS of claim 11, wherein the operations further comprise:
uploading the real-time data labeled by the first inference data, and the retrained student edge model to the cloud platform, wherein a cloud model of the AI model is configured to retrain the teacher edge model and the student edge model based at least partly on the labeled real-time data in view of the retrained student edge model of the AI model.

13. The VOS of claim 11, wherein the operations further comprise:
receiving the retrained teacher edge model and the retrained student edge model from the cloud platform; and
replacing the teacher edge model and the student edge model in the ADV respectively with the retrained teacher edge model and the retrained student edge model.

14. The VOS of claim 11, wherein the real-time data is collected by a system monitor in the VOS or by one or more sensors in the ADV.

15. The VOS of claim 11, wherein the AI model is one of a plurality of AI models deployed to the VOS of the ADV, wherein the plurality of AI models include a power consumption reduction AI model, a storage life extension AI model, a temperature prediction and control AI model, a resource management AI model, an IPC optimization AI model, a perception AI model, a localization AI model, a prediction AI model, a decision AI model, a planning AI model, and a control AI model.

16. The VOS of claim 15, wherein each of the plurality of AI models is a deep learning neural network.

17. The VOS of claim 15, wherein the power consumption reduction AI model is configured to classify a task as a task with a priority level, wherein the priority level corresponds to a power consumption limit.

18. The VOS of claim 15, wherein the storage life extension AI model is configured to select a path that requires a smallest number of writes to a storage medium when a plurality of paths are available.

19. The VOS of claim 15, wherein the temperature prediction and control AI model is configured to predict that a sequence of applications is to cause a temperature of a multiprocessor unit (MPU) to reach a predetermined level, and to schedule a different sequence of applications so as to avoid the temperature from reaching the predetermined level.

20. The VOS of claim 15, wherein the IPC optimization AI model is configured to select a communications channel between a multiprocessor unit (MPU) and a microcontroller unit (MCU) based on a number of factors, including traffic in a data path and a priority level of a task associated with a data transfer.

* * * * *